(12) United States Patent
Cocke

(10) Patent No.: US 9,393,680 B2
(45) Date of Patent: Jul. 19, 2016

(54) BOILING WATER REACTOR CORE SHROUD HEAD BOLT RETAINER TOOL

(71) Applicant: AREVA Inc., Lynchburg, VA (US)

(72) Inventor: Jason B. Cocke, Forest, VA (US)

(73) Assignee: AREVA Inc., Lynchburg, VA (US)

( * ) Notice: Subject to any disclaimer, the term of this patent is extended or adjusted under 35 U.S.C. 154(b) by 72 days.

(21) Appl. No.: 14/724,230

(22) Filed: May 28, 2015

(65) Prior Publication Data

US 2015/0340107 A1 Nov. 26, 2015

Related U.S. Application Data

(63) Continuation of application No. 13/316,980, filed on Dec. 12, 2011, now Pat. No. 9,061,405.

(60) Provisional application No. 61/522,511, filed on Aug. 11, 2011.

(51) Int. Cl.
  *B25B 27/02* (2006.01)
  *B23P 19/04* (2006.01)
  *G21C 19/20* (2006.01)

(52) U.S. Cl.
  CPC ............. *B25B 27/023* (2013.01); *B23P 19/048* (2013.01); *G21C 19/20* (2013.01); *G21C 19/207* (2013.01); *Y10T 29/49826* (2015.01); *Y10T 29/531* (2015.01)

(58) Field of Classification Search
  CPC ........ B25B 27/06; B25B 27/02; B23P 19/025
  See application file for complete search history.

(56) References Cited

U.S. PATENT DOCUMENTS

| | | |
|---|---|---|
| 3,200,484 A | 8/1965 | Garman |
| 3,722,332 A | 3/1973 | Jones |
| 3,847,041 A | 11/1974 | Meschonat et al. |
| 4,166,313 A | 9/1979 | Walton |
| 4,219,386 A | 8/1980 | Flora et al. |
| 4,499,796 A | 2/1985 | Miller |
| 4,548,103 A | 10/1985 | Orban |
| 4,552,038 A | 11/1985 | Heiermann et al. |
| 4,672,731 A * | 6/1987 | Taylor ........... B25B 27/023 29/259 |
| 4,991,280 A | 2/1991 | Reimer et al. |
| 5,734,690 A | 3/1998 | Sakamaki |
| 6,076,437 A | 6/2000 | Saint Martin |
| 6,266,860 B1 | 7/2001 | Kiebler |
| 7,246,547 B2 | 7/2007 | Van Walraven |
| 7,757,779 B2 | 7/2010 | Jacobsson et al. |
| 7,996,972 B2 * | 8/2011 | Hu ............... B25B 27/026 29/252 |

(Continued)

OTHER PUBLICATIONS

International Preliminary Report on Patentability for PCT Application No. PCT/US2012/50075, dated Feb. 11, 2014.

(Continued)

*Primary Examiner* — Lee D Wilson
(74) *Attorney, Agent, or Firm* — Davidson, Davidson & Kappel, LLC

(57) ABSTRACT

The inventive tool is designed to ensure proper plant operation position of the core shroud head bolt assemblies of a boiling water nuclear reactor. The tool exerts an upward pulling force on stuck retainers to return them to the locking position around the nut. The tool includes a frame, an engagement member, and a collar. The engagement member is lowered toward and end of the bolt until it comes into contact therewith. Further movement of the engagement member causes the frame and collar to move upward, lifting the retainer and extending the spring.

20 Claims, 4 Drawing Sheets

(56) References Cited

U.S. PATENT DOCUMENTS

| | | | | |
|---|---|---|---|---|
| 8,256,081 B2* | 9/2012 | Fridman | ............... | B25B 27/062 |
| | | | | 29/244 |
| 9,061,405 B2* | 6/2015 | Cocke | ................... | B25B 27/023 |
| 2015/0340107 A1* | 11/2015 | Cocke | ................... | B25B 27/023 |
| | | | | 29/723 |

OTHER PUBLICATIONS

International Search Report for PCT Application No. PCT/US2012/50075, dated Mar. 29, 2013.

Written Opinion for PCT Application No. PCT/US2012/50075, dated Mar. 29, 2013.

\* cited by examiner

BOILING WATER REACTOR CORE SHROUD HEAD BOLT RETAINER TOOL

CROSS-REFERENCE TO RELATED APPLICATIONS

This patent application is a continuation of U.S. patent application Ser. No. 13/316,980 filed on Dec. 12, 2011, now allowed, which claims the benefit of U.S. Provisional Patent Application No. 61/522,511 filed on Aug. 11, 2011. These patent applications are incorporated herein by reference in their entireties.

BACKGROUND OF THE INVENTION

1. Field of the Invention

The present invention relates to a boiling water reactor core shroud head bolt removal tool, and, more particularly, the present invention relates to a tool for ensuring safe removal and installation of core shroud head bolts to the proper position.

2. Description of the Related Art

Core shrouds are components of boiling water nuclear reactors; they are cylindrical structures that surround the core to provide a barrier to separate the downward coolant flow through the annulus from the upward flow through the core. The core shrouds also structurally support and align the fuel assemblies, steam separator assemblies, and control rod guide tubes. A head sits atop the shroud and creates an upper plenum into which a two-phase steam/water mixture enters from the core and is directed to steam separation equipment.

The core shroud head must be removed to access the core for refueling and inspection of the core internals. During removal and installation of the core shroud head, it is necessary to de-tension and tension the core shroud head bolts. These bolts have a spring pushing upward against a retainer, which locks the nut on the shroud head bolt assembly, preventing the nut from rotating. Due to many years of service, and with the accumulation of grit and grime, the retainers may not return to the locked position with just spring pressure. What is needed is a tool that ensures removal and replacement of the core shroud head bolts with the spring retainers in the proper position.

SUMMARY OF THE INVENTION

The inventive tool is designed to remove and replace core shroud head bolts, while exerting an upward pulling force on stuck retainers, returning them to the locking position around the nut. The tool includes a relatively stationary base or frame, a collar, and an engagement member. With the core shroud bolt in position on the shroud head, tool is positioned about the nut portion of the core shroud bolt assembly such that the frame spans the length of the nut portion with the collar positioned beneath the retainer and the engagement member positioned above the end portion of the bolt. The engagement member, which may be provided in the form of a hex nut, is tightened until its stop seats against the top of the shroud head bolt. Additional torquing of the engagement member causes the tool housing, including the lower collar, to rise up, which in turn pulls the shroud head bolt retainer back into its lock position.

DESCRIPTION OF THE DRAWINGS

The present invention is described with reference to the accompanying drawings, in which like reference characters reference like elements, and wherein.

DETAILED DESCRIPTION OF THE INVENTION

Figure 1:
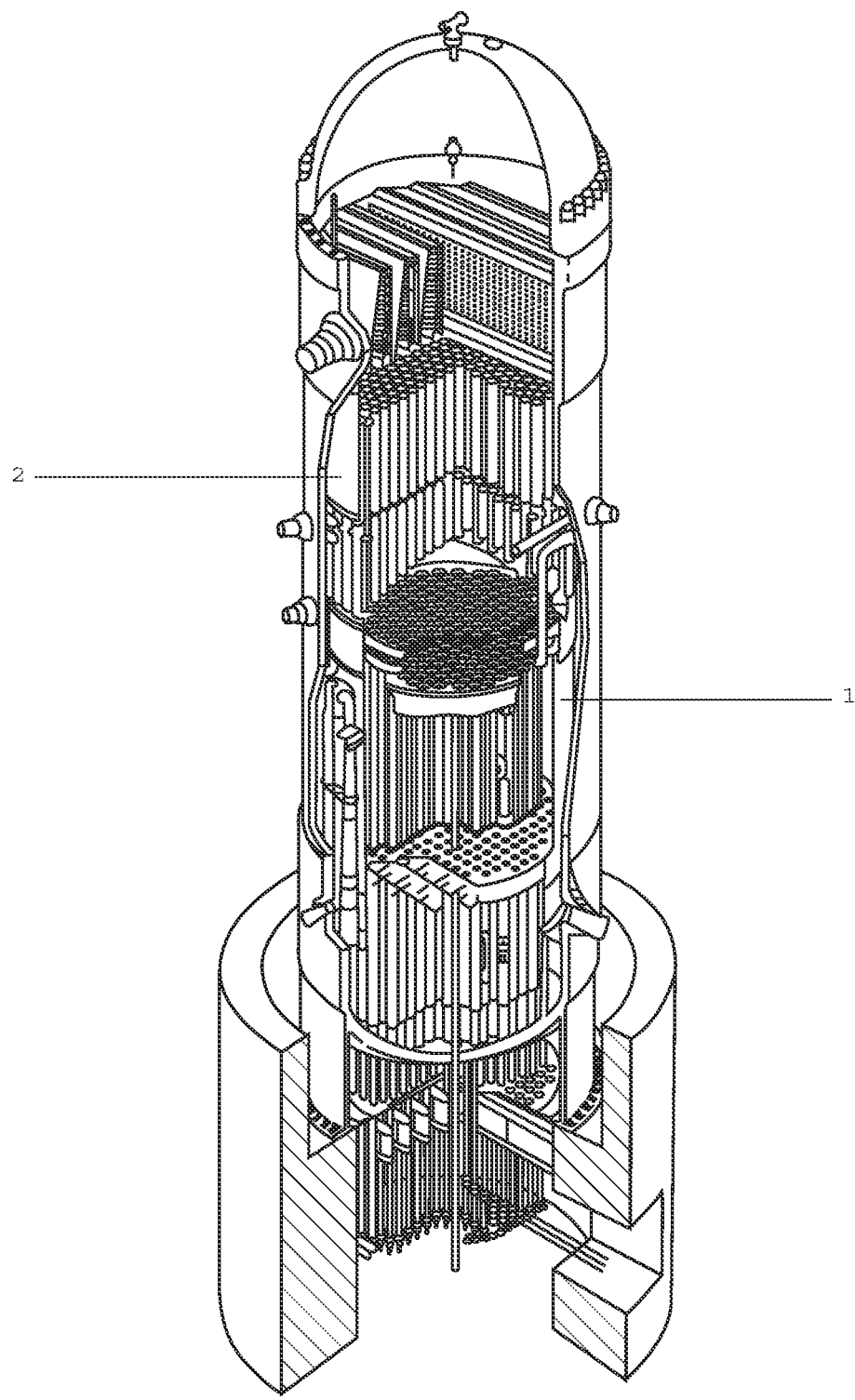
FIG. 1 shows a typical commercial boiling water reactor, partially cut-away.

In a typical commercial boiling-water reactor, such as illustrated in FIG. 1, the core inside the reactor vessel creates heat, a steam-water mixture is produced when water (reactor coolant) moves upward through the core, absorbing heat. The steam-water mixture leaves the top of the core and passes through moisture separation equipment where water droplets are removed before the steam is allowed to enter the steam line. The steam line directs the steam to the main turbine, causing it to turn the turbine generator, which produces electricity. The unused steam is exhausted into the condenser where it is condensed into water. The resulting water is pumped back to the reactor vessel.

The reactor core contains fuel assemblies that are cooled by water circulated therethrough. A majority of coolant flows down through an annulus created between the reactor vessel wall and the core shroud 1, while a portion of the coolant is directed through jet pumps located within the annulus that ensure proper flow upward through the core.

Figure 2:
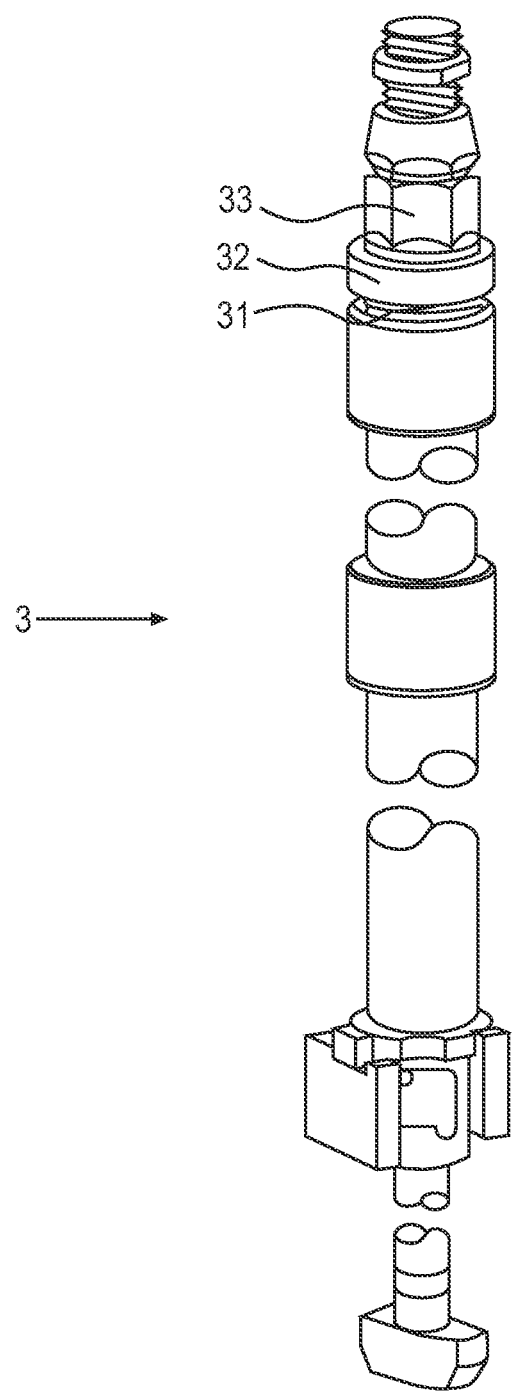
FIG. 2 shows a detailed view of a typical core shroud head bolt.

A head 2 sits atop the core shroud 1 and creates an upper plenum into which a two-phase steam/water mixture enters from the core and is directed to steam separation equipment. The head 2 is attached to the shroud 1 by a plurality of core shroud head bolts 3, a detailed view of which is presented in FIG. 2. A typical shroud-head bolt 3 is 1.75 in. in diameter and 14 ft long. A nut is screwed onto one end of the bolt, and a tee head is welded to the other. A sleeve covers the rest of the bolt 3, and the base of the sleeve is joined to a collar that is welded to the shaft near the tee head. A part of the collar is cut out to provide space for an alignment pin window.

The head 2 must be removed from the shroud 1 to access the core for refueling and inspection of the core internals. During removal and installation of the core shroud head 2, it is necessary to tension and de-tension the core shroud head bolts 3. These bolts 3 have a spring 31 pushing upward against a retainer 32, which locks the nut 33 on the shroud head bolt assembly 3, preventing the nut 33 from rotating. Due to many years of service, and with the accumulation of grit and grime, the retainers may not return to the locked position with just spring pressure.

Figure 3:
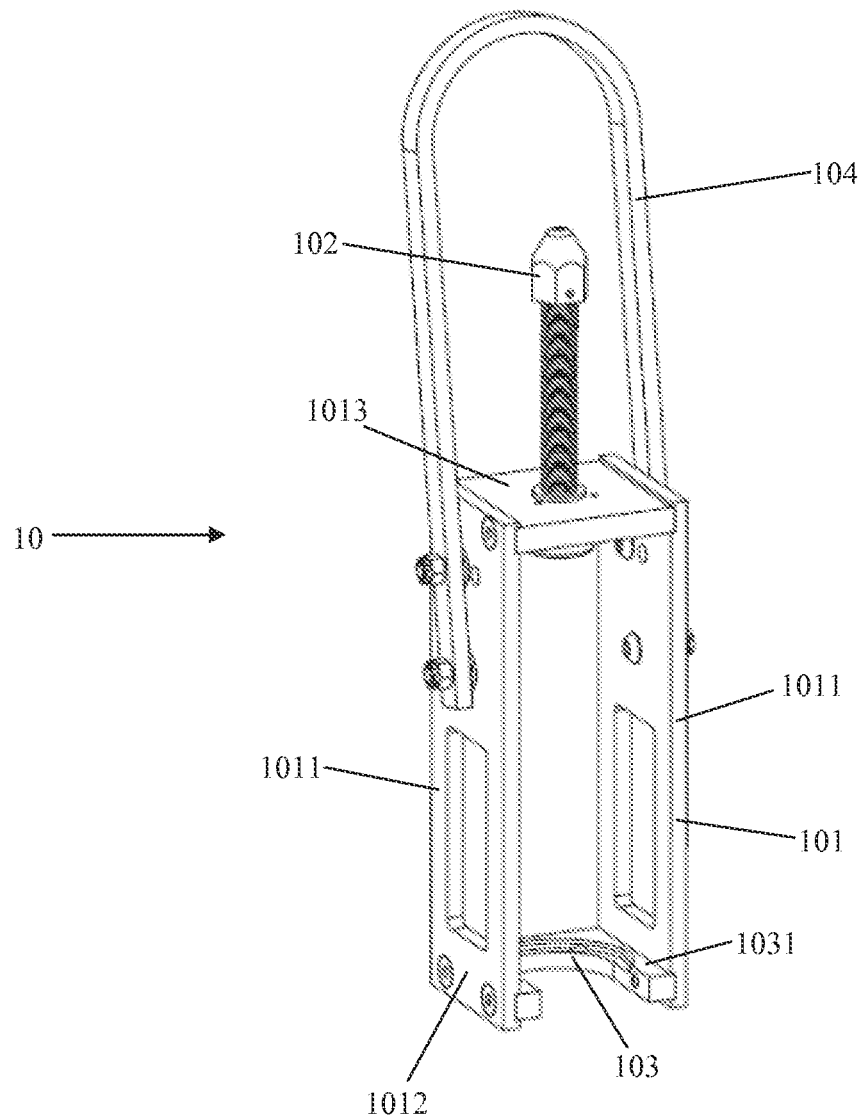
FIG. 3 shows an embodiment of a tool of the present invention.
Figure 4:
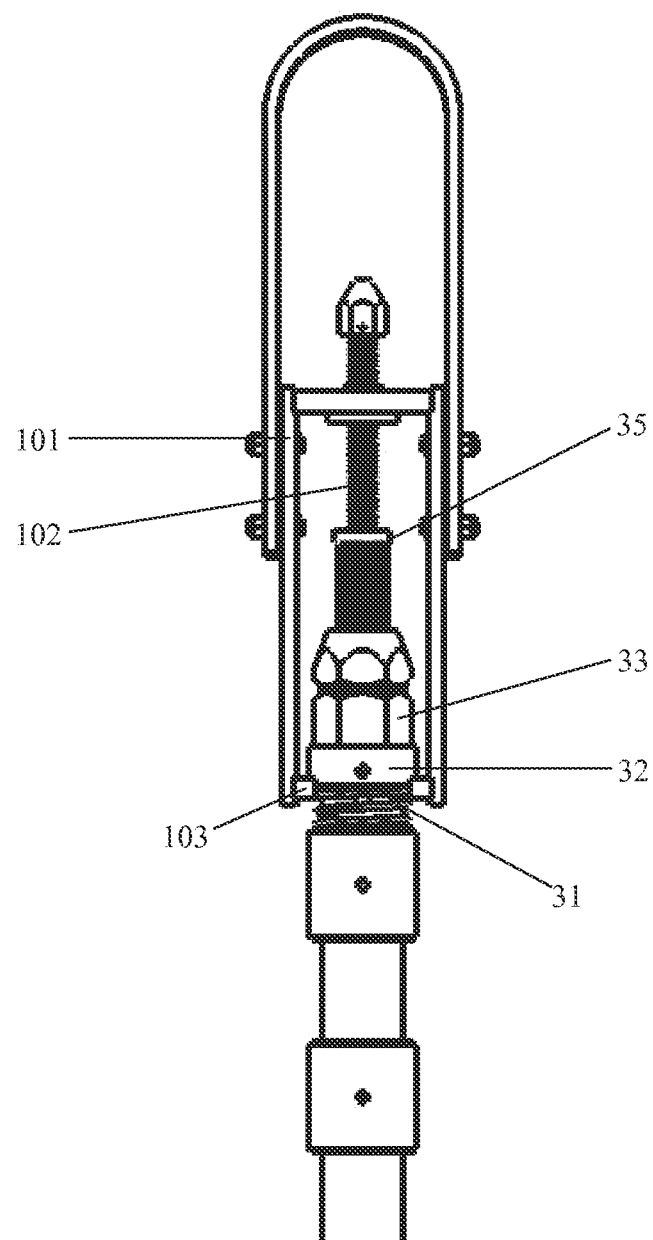
FIG. 4 shows the tool of FIG. 3 in position on a core shroud bolt.

FIG. 3 illustrates an embodiment of a tool 10 for removal and replacement of the core shroud head bolts while ensuring the retainers 32 are returned to the proper position, and FIG. 4 illustrates the tool 10 in position on a mock-up core shroud bolt 3. The tool 10 includes a base or frame 101, an engagement member 102, and a collar 103.

As shown in the exemplary embodiment illustrated in FIGS. 3 and 4, the frame 101 may include elongate arms 1011 that provide a height element to the tool 10 such that it spans the distance between the spring 31 and the uppermost end of the nut 3 with clearance to maneuver the tool 10 around the nut 3. The frame 101 may include a panel 1013 at one end thereof. Preferably, the panel 1013 is oriented such that it is substantially perpendicular to the longitudinal axes of the arms 1011. The panel 1013 is preferably secured to an end of each arm 1011. Pairs of arms 1011 may be connected at their second end distal from panel 1013 by a transverse arm 1012 extending between the elongate arms 1011. The transverse arms 1012 may be separate elements or may be integral to their associated elongate arms 1011. By connecting the distal ends of the elongate arms 1011, the transverse arms 1012 help ensure a robust frame 101 that can withstand the stresses and strains of normal use. Two such transverse arms 1012 are shown in the illustrated embodiment of FIGS. 3 and 4, but at least a third transverse arm could also be included. One side of the frame 101 should be left open, however, to facilitate placement of the tool 10 on the bolt 3.

The engagement member 102 is movably coupled to the frame 101. Preferably, the engagement member 102 is threadably coupled to the panel 1013 such that the longitudinal axis of the engagement member 102 is substantially parallel to the longitudinal axes of the elongate arms 1011 and substantially perpendicular to the plane of the panel 1013 and the longitudinal axis of the transverse arms 1012. Ideally, the engagement member 102 is substantially centered in the panel 1013 and between the arms 1011. Thus, the engagement member 102 preferably is coupled to a substantially central location of the panel 1013 with the longitudinal axis of the engagement member 102 being substantially equidistant from each of the longitudinal axes of the elongate arms 1011.

The collar 103 is coupled to the frame 101 at its second end, distal to the engagement member 102. Preferably, the collar 103 is connected to each of the transverse arms 1012. The collar has an arcuate shape that facilitates its placement around the spring 31. The collar 103 extends inwardly away from the frame 101 in a plane that preferably is substantially parallel to the panel 1013, thus forming a ledge 1031 that can be used to contact and exert force against the retainer 32. Preferably, the collar 103 is substantially centered in the frame between the elongate arms 1011.

After the bolt 3 has been placed in its plant operation position and the nut 33 has been tightened in known manner, the tool 10 is lowered onto the bolt 3 such that the collar 103 is below the retainer 32 and adjacent the spring 31, and the engagement member 102 is above the uppermost end of the bolt 3. A crane, such as the plant's overhead crane, in conjunction with an optional handle 104 may be used to accomplish this movement. Proper position of the tool 10 on the bolt 3 can be ensured via line of sight or through the use of cameras (not shown). The engagement member 102 is then rotated in a clockwise direction (from the perspective above the tool 10), which causes the engagement member 102 to be lowered relative the frame 101. Such rotation continues until the lowermost end of the engagement member 102 comes into contact with the end or stop 35 of the core shroud head bolt 3.

Once the engagement member 102 is in contact with the bolt stop 35, further rotation of the engagement member 102 will cause the frame 101 and collar 103 to move relatively upward, as the bolt stop prevents further downward movement of the engagement member 102. As the collar is initially positioned adjacent the spring 31, it will come into contact with the retainer 32, and with continued engagement member 102 rotation will lift the retainer 32 and extend the spring 31. Preferably, the ledge 1031 portion of the collar 103 contacts and exerts force against the retainer 32. Thus, rotating the engagement member 102 to impart a downward force via the engagement member 102 results in an upward force imparted to the retainer 32 via the collar 103. When it has been determined that the retainer 32 and spring 31 are in their proper plant operation position, the engagement member is rotated in the opposite (counter-clockwise) direction to lower the frame 101 and collar 103, and to back the engagement member 102 away from the bolt 3 so that the tool 10 can be removed.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Any directional orientation references hereinabove, such as above or below, are provided for ease of explanation and understanding, and should not be taken as limiting. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A tool configured to reposition a spring-biased retainer of a boiling water reactor core shroud head bolt about a head bolt nut, the tool comprising:
    a frame having a first end and a second end, said frame including two elongate arms each having a longitudinal axis and first and second ends, and a unitary panel coupled to said elongate arms at their first ends, said frame defining a side opening between said elongate arms;
    an engagement member coupled to said frame at said first end such that said frame and said engagement member are relatively movable; and
    a collar coupled to said frame at said second end, said collar defining an opening therein, said collar opening being aligned with said frame side opening, said collar connecting said elongate arms at their second ends opposite said collar opening;
    wherein the tool is configured to exert a repositioning force to the retainer upon engagement of said engagement member with the core shroud head bolt.

2. The tool of claim 1, wherein said frame side opening extends from said panel to said collar opening.

3. The tool of claim 1, wherein said engagement member has a longitudinal axis and is coupled to said frame at said panel.

4. The tool of claim 3, wherein said engagement member longitudinal axis is substantially parallel to the longitudinal axis of at least one of said elongate arms.

5. The tool of claim 4, wherein said engagement member is coupled to a substantially central location of said panel and said engagement member longitudinal axis is substantially equidistant from the longitudinal axes of each of said elongate arms.

6. The tool of claim 1, wherein said engagement member is threadably coupled to said frame.

7. The tool of claim 1, wherein said collar has an arcuate shape.

8. The tool of claim 1, wherein:
    said elongate arms are substantially parallel;
    said panel is substantially perpendicular to said elongate arms; and
    said collar is substantially centered in said frame between said elongate arms and substantially parallel to said panel.

9. The tool of claim 8, wherein said collar extends inward from said elongate arms toward a center of said frame.

10. A tool configured to reposition a spring-biased retainer of a boiling water reactor core shroud head bolt about a head bolt nut, the tool comprising:

a frame having a first end and a second end, said frame including two side panels each having a longitudinal axis and first and second ends, and a unitary top panel coupled to said side panels at their first ends, said frame defining a side opening between said side panels;

an engagement member coupled to said frame at said first end such that said frame and said engagement member are relatively movable; and a collar coupled to said frame at said second end, said collar defining an opening therein, said collar opening being aligned with said frame side opening, said collar connecting said side panels at their second ends opposite said collar opening;

wherein the tool is configured to exert a repositioning force to the retainer upon engagement of said engagement member with the core shroud head bolt.

11. The tool of claim 10, wherein said frame side opening extends from said top panel to said collar opening.

12. The tool of claim 10, wherein said engagement member has a longitudinal axis and is coupled to said frame at said panel.

13. The tool of claim 12, wherein said engagement member longitudinal axis is substantially parallel to the longitudinal axis of at least one of said side panels.

14. The tool of claim 13, wherein said engagement member is coupled to a substantially central location of said top panel and said engagement member longitudinal axis is substantially equidistant from the longitudinal axes of each of said side panels.

15. The tool of claim 10, wherein said engagement member is threadably coupled to said frame.

16. The tool of claim 10, wherein said collar has an arcuate shape.

17. The tool of claim 10, wherein:

said side panels are substantially parallel;

said top panel is substantially perpendicular to said side panels; and said collar is substantially centered in said frame between said side panels and substantially parallel to said top panel.

18. The tool of claim 17, wherein said collar extends inward from said side panels toward a center of said frame.

19. The tool of claim 10, wherein at least one of said side panels defines an opening therein, said opening defining two elongate arms.

20. The tool of claim 10, wherein each of said side panels defines an opening therein, each opening defining two elongate arms.

* * * * *